United States Patent Office 3,428,522
Patented Feb. 18, 1969

3,428,522
METHOD AND DEVICE FOR THE REFUELLING OF NUCLEAR REACTORS
Arno Müller, Neuthard, Germany, assignor to Gesellschaft für Kernforschung m.b.H., Karlsruhe, Germany
Filed Nov. 24, 1965, Ser. No. 510,146
Claims priority, application Germany, Nov. 24, 1964, G 42,086
U.S. Cl. 176—31     7 Claims
Int. Cl. G21c *19/20, 19/10, 19/04*

ABSTRACT OF THE DISCLOSURE

This specification discloses a novel core element insertion and removal device for use in connection with nuclear reactors. The type of nuclear reactor particularly pertinent is one in which a core of fuel elements is provided, totally immersed in a liquid coolant, preferably a liquid sodium coolant. According to this disclosure, a core loading tube having a grasping or grappling means therein for mechanically lifting or lowering individual core elements is provided within the reactor which can be controlled from a remote source. There is described a gas blanket above the level of liquid coolant and a pumping or gas blower means connected to the gas space above the coolant. When it is desired to change, remove or insert core elements, the gas pressure is increased in the reactor, whereby the liquid level is significantly reduced. The loading tube is positioned on top of a particular core element and the grasping or grappling means is engaged with the core element. Means are provided for describing the pressure within the loading tube so that as the core element is mechanically lifted from the core, the coolant level rises within the loading tube in order to provide a coolant bath completely covering the core elements, even after such has been extracted into the loading tube.

---

The invention relates to a method and a device for loading and unloading core elements in nuclear reactors cooled by media which are liquid in the operating state, sodium in particular, in which the coolant level in the reactor vessel is reduced from normal operating pressure. For nuclear reactors cooled by liquid coolants methods of loading are known in which the loading device is immersed in the coolant when operating. However, this method has the disadvantages of the sensitive control elements of the loading device also being wetted by the coolant and of requiring a blind approach to the fuel element positions, i.e., the fuel position must be approached only by a given system of coordinates.

It has been suggested also to lower the coolant level during refueling far enough to make the heads of the fuel elements visible above the coolant level. Although this greatly facilitates gripping the fuel elements, because it is possible to manipulate the gripping action from sight by observation devices, the fuel element withdrawn into the loading tube out of the core can no longer be cooled at all or only by cooling gas.

It is the purpose of this invention to create a method and a device for the exchange of core elements in nuclear reactors which facilitates gripping of the core elements by the gripping device from sight and also cooling by the coolant in the loading tube. To do this, the coolant level is lowered in the reactor also in this method according to the invention. However, according to the invention a differential pressure is maintained during loading and unloading between the gas pressure above the liquid coolant in the reactor vessel and the pressure in the loading tube immersed into the cooling liquid with its open bottom section, this differential pressure corresponding at least to a liquid coolant column extending to the upper end of the core element drawn into the loading tube.

This method offers the advantage of the core element being still cooled also in the loading tube of the loading machine, since the cooling liquid extends at least to the upper end of the fuel element in the loading tube also when the coolant level has been lowered. It can be observed in this case how the fuel elements are gripped by the grab of the loading machine so that no complicated control elements are required to reach the fuel element positions.

Figure 1:
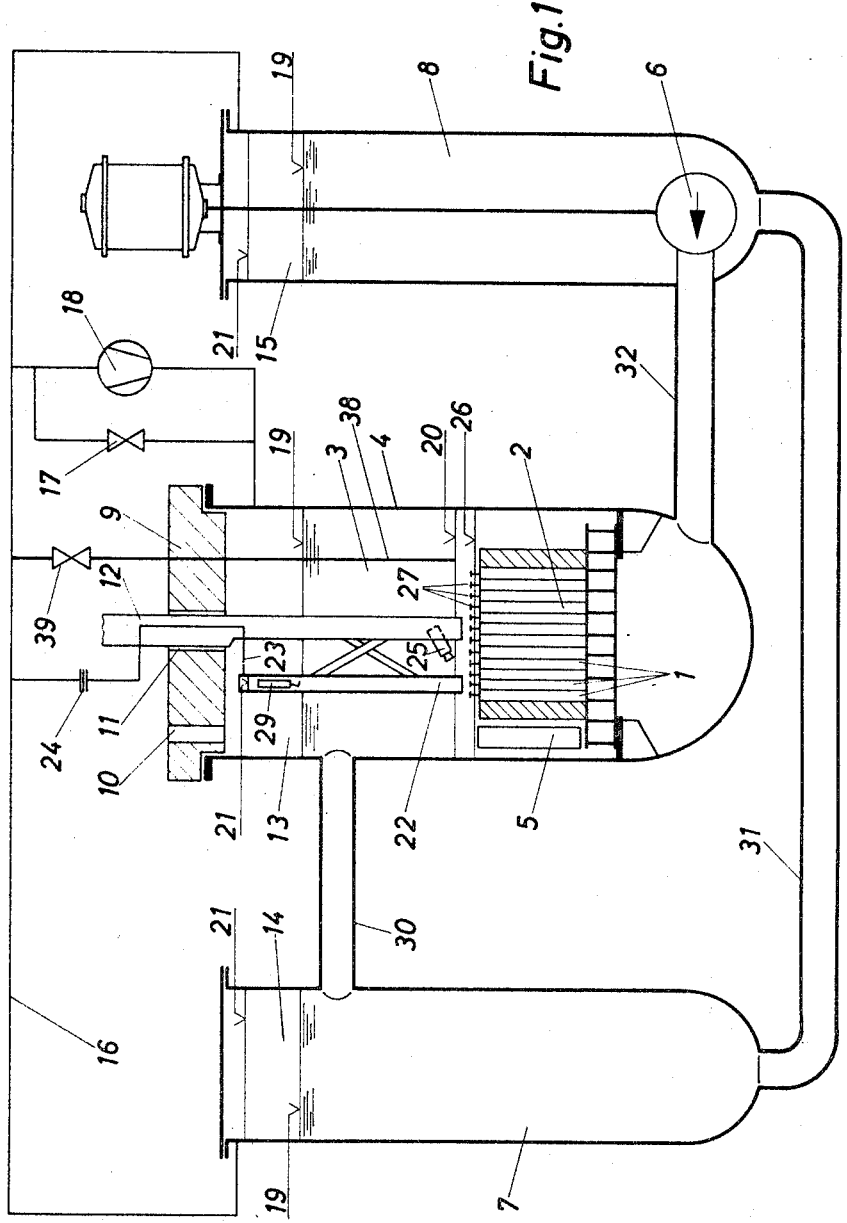
Figure 2:
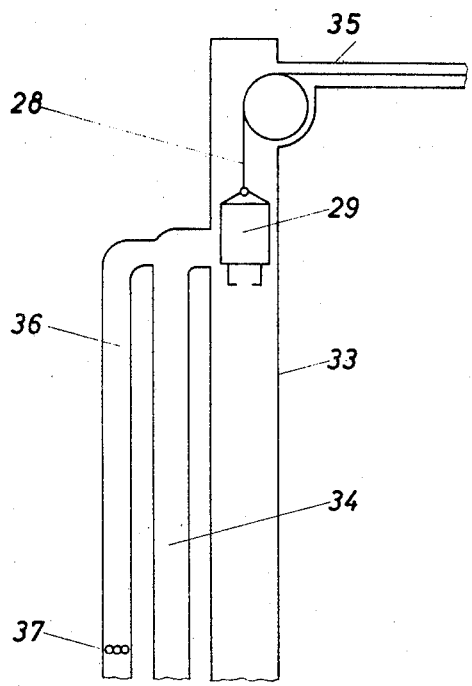

Details of the method according to the invention and particularly favorable devices for the execution of the method are explained in more detail on the basis of the figures:

FIG. 1 shows a sodium-cooled nuclear reactor,
FIG. 2 shows the loading tube.

In the reactor installation as shown in FIG. 1 the reactor core 2 composed of the fuel elements 1 is contained in the reactor vessel 4 filled with coolant 3. The reactor vessel 4 also contains an intermediate storage space 5 for the core elements. The top shield 9 of the reactor vessel is provided with a passage 10 for the core elements and a passage 11 for the loading device 12. The reactor vessel 4 and the top shield 9 of the vessel are surrounded and/or equipped with a radiation shielding not indicated in the drawing. The pipes 30, 31, 32 connect the heat exchangers 7 and the circulation pumps 6 with the coolant storage tanks 8 to the reactor vessel 4. The spaces 13 of the reactor vessel 4 filled with inert gas above the coolant, space 14 in the heat exchanger 7, space 15 of the storage tank 8 are interconnected by a pressure equalization line 16. In the branch pipe of the pressure equalization line leading to the reactor vessel 4 there is an additional shutoff valve 17 and a blower 18 to increase the pressure.

During normal reactor operation valve 17 is open. In spaces 13, 14 and 15 there is an equal pressure in this operating condition. Owing to the slight loss of coolant pressure in pipes 30, 31 and 32 and in the heat exchanger 7 the coolant level 19 thus is practically equally high in all spaces. The loading device 12 is outside the reactor vessel during reactor operation, e.g. withdrawn into the interior of the shielding of top shield 9 or in a gastight protective flask arranged on the top shield of the vessel.

For refueling valve 17 is closed after shutdown of the reactor installation, blower 18 is turned on to increase the pressure in space 13. This reduces the coolant level 19 in the reactor vessel down to the level of 20. At the same time the level rises up to 21 in spaces 14 and 15. When reaching the level of 20 the protective gas supplied by the blower 18 starts flowing into the immersion tube 38 which is connected with the equalization line 16 so that there is no further reduction of the coolant level. Valve 39 remains open during this phase. Now the loading device 12 is introduced into the enlarged gas space 13. The loading tube 22 of the loading device 12 is connected with the pressure equalization line 16, i.e., spaces 14 and 15 which are maintained at a lower pressure by pipe 23 and throttle 24. During introduction of the loading machine in its operating position there is thus a constant flow of gas limited by the throttle 24 from space 13 through pipes 23 and 16 into spaces 14 and 15. After immersion of the loading tube 22 into the coolant level 20, however, the coolant in the loading tube 22 will rise up to the level of 21 owing to the differential pressure existing between spaces 13 on the one hand and 14 and 15 on the other hand. Now the loading tube 22 is moved on top of the fuel element position to be discharged. Then the proper fuel element is gripped by a grab 29 installed in a mobile attachment in the loading tube 22, drawn into the loading tube and taken to the intermediate storage space 5 by subsequent lowering. The fuel element, most practically after a proper period of decay, is removed from the intermediate storage space 5, by a removal device, not indicated in the drawing, introduced through passage 10 in the top shield of the vessel 9. The new fuel elements are introduced into the reactor core 2 in the reverse order, also via the intermediate storage space 5.

The plant as described herein for the execution of the method according to the invention may be varied in many ways. In particular, it is possible to lower the coolant level in the reactor vessel 4 also in a different way, e.g. by discharging cooling water into a different tank.

In the method according to the invention it is easy to observe the approach the fuel element positions and the coupling of the grab to the fuel element by means of a periscope or a TV system 25. In this case the coolant level in the reactor vessel will first be lowered to the level of 26 so as to make the fuel element heads 27 become visible; then the loading tube 22 may be adjusted and the grab 29 attached. For regulating the coolant level it is best to use an overflow. Then the coolant may be raised to 20 where it will be held throughout the rest of the loading process, and the process of refueling may be carried out as described above. The settling positions in the intermediate storage space 5 for the fuel elements are approached without visual control under cooling. However, this is easy, because the settling positions may be made with large tolerances. It is possible without any difficulty to take fresh fuel elements to their exact positions in the reactor core under visual control, i.e., with the coolant level far lowered, since these elements do not generate any heat and thus do not need to be cooled.

FIG. 2 shows a loading tube for the execution of the method according to the invention. The grab 29 suspended from a cable 28 is vertically arranged in the loading tube 33 so as to be mobile. In the upper section, but still below the upper coolant level formed in the loading tube during the loading process, a coolant reflux channel 34 is attached to the loading tube 33, the bottom opening of which is at the same level as the bottom opening of the guide tube 33 and therefore is filled with coolant at the same time as the loading tube 33. This coolant reflux channel 34 allows an effective coolant circulation when there is a heat generating fuel element in the guide channel and the fuel element starts to boil because of some delay in transport. The coolant vapor generated in ths phase flows through the lines 23 into the pressure equalization line 16 and the equipment connected with it; here it condenses upon the walls which are kept at low temperatures.

An effective coolant circulation in the guide channel may be obtained also by providing small openings in the wall of the guide channel in its bottom section, but only above the coolant level of 20. Through these openings a certain amount of protective gas is constantly drawn out of space 13 to the guide tube, which is filled with coolant, so that the average specific weight of the coolant in the guide channel is reduced and circulation starts. The protective gas which has entered the guide channel flows off through line 23 just as the coolant vapor produced in the method described first.

It is possible to generate coolant circulation in the loading tube 33 and the down pipe 34 connected to it by adding a colder coolant flow in the upper section of the circulating system to the coolant flow which has risen in the loading tube.

In this way the temperature of the coolant which has risen in the loading tube and is heated by the fuel element is reduced before the coolant falls through the down pipe again. It is reasonable to supply additional cold coolant flow to the mixing point indicated in FIG. 2 by a riser 36. A nozzle system has been installed in the bottom section of the riser through which protective gas is fed into the rising coolant flow to reduce the density. The protective gas is removed through pipe 35. For the separation of any traces of coolant which may have been carried along it is possible to install a liquid trap either in this line or in the upper section of the loading tube.

In addition, it is possible also to alternately fill the loading tube with coolant and drain it again by connecting the interior of the loading tube alternately with the vacuum line 23 and the interior of the reactor vessel, respectively. This makes the coolant flow constantly past the fuel element 29 in the loading tube 22, although in alternating directions of flow.

The cable 28 running up to the lifting gear of the loading machine runs inside the protective tube 25 at the same time can be line 23 of FIG. 1. However, other executions of the drive of the chucks of the grab are also possible. Thus, it is possible, e.g., to provide a direct electric driving mechanism for the chuck of the grab or to run the cable out of the guide tube through a stuffing-box packing and install a separate, possibly flexible line 23.

I claim:

1. Apparatus for the loading and unloading of core elements in a nuclear reactor comprising a housing; core elements contained in said housing; liquid coolant within said housing completely immersing said core elements; core loading tube means within said housing; grasping means within said tube; liquid reservoir means operatively associated with said coolant in said housing; gas reservoir means operatively associated with gas space above said coolant in said housing; gas blower means operatively associated with said gas space, said gas reservoir and said loading tube; and means for operatively engaging a core element with said grasping means while said core element is in place in said core; wherein said blower is adapted to increase the gas pressure in said housing to provide a reduction in the liquid coolant level therein and thereby cause said liquid coolant to flow into said tube while said grasping means extracts said core element from said core.

2. Apparatus as claimed in claim 1 wherein said loading tube has a coolant reflux channel associated therewith of equivalent length thereto and communicating with the loading tube below the level of liquid in said loading tube.

3. Apparatus as claimed in claim 2 wherein said loading tube has apertures in the lower portion thereof adapted to receive gas therethrough and adapted to be positioned above the surface of the coolant liquid after the pressure of said gas space has been increased, whereby the coolant level therein has been decreased.

4. Apparatus as claimed in claim 2, including reversible valve means operatively associated with said loading tube and disposed in a line between said loading tube and the interior of said housing.

5. Device for the loading of fuel elements in a nuclear reactor having a reaction zone and a fuel storage means cooled by liquid, the reaction zone and fuel element storage means of which are completely covered by a coolant within the reactor vessel, consisting of a fuel element loading tube, which is movable above the fuel element positions of the reaction zone or the fuel element storage means, a gripping device in the fuel element loading tube for the lifting and lowering of the fuel elements, means for producing and maintaining a differential pressure between the reactor vessel and the fuel element loading tube which is immersed into the coolant with its lower open end, so that the coolant in the fuel element loading tube rises above the fuel element contained therein, a coolant reflux channel, the lower open end of which is on the same level as the lower end of the fuel element loading tube and the upper end of which opens (ends) below the liquid surface which adjusts itself within the fuel element loading tube during the loading action.

6. Device according to claim 5, in which the fuel element loading tube is provided at its lower end, but still above the coolant surface surmounting the reaction zone, with small gas inlet openings.

7. Method of loading and unloading core elements in a nuclear reactor, which reactor comprises a housing; core elements contained in said housing; liquid coolant within said housing completely immersing said core elements; core loading tube means within said housing; grasping means within said tube; liquid reservoir means operatively associated with said coolant in said housing; gas reservoir means operatively associated with gas space above said coolant in said housing; gas blower means operatively associated with said gas space, said gas reservoir and said loading tube; and means for operatively engaging a core element with said grasping means while said core element is in place in said core; wherein said blower is adapted to increase the gas pressure in said housing to provide a reduction in the liquid coolant level therein and thereby cause said liquid coolant to flow into said tube while said grasping means extracts said core element from said core; which method comprises positioning said tube in operative association with said core element; increasing the pressure in said gas space whereby the coolant level is decreased in said housing and the level of coolant is increased in said tube; engaging said core element with said grasping device; extracting said core element into said tube while maintaining such immersed in coolant; and depositing said core element in an intermediate holding zone immersed in said coolant and separated from said core.

References Cited

UNITED STATES PATENTS

| 3,104,217 | 9/1963 | Long | 176—30 |
| 3,169,117 | 2/1965 | Dickinson et al. | 176—40 |
| 3,182,002 | 5/1965 | Laithwaite et al. | 176—40 |

FOREIGN PATENTS

| 609,326 | 11/1960 | Canada. |
| 908,130 | 10/1962 | Great Britain. |

OTHER REFERENCES

Kumpf, German Application #1,065,101, printed Sept. 10, 1959 (KL 21g 21/20), 1 sheet drwg., 2 pp. Spec.

REUBEN EPSTEIN, *Primary Examiner.*

H. E. BEHREND, *Assistant Examiner.*

U.S. Cl. X.R.

176—52